United States Patent [19]

Ando et al.

[11] Patent Number: 4,605,263
[45] Date of Patent: Aug. 12, 1986

[54] ANTISKID CONTROL APPARATUS FOR AUTOMOBILES

[75] Inventors: Masamoto Ando; Hiroaki Takeuchi, both of Toyota; Toyohisa Yamada, Anjo; Toshihiko Yamanaka, Toyota, all of Japan

[73] Assignee: Aisin Seiki Kabushiki Kaisha, Kariya, Japan

[21] Appl. No.: 750,135

[22] Filed: Jul. 1, 1985

[30] Foreign Application Priority Data

| Jul. 2, 1984 | [JP] | Japan | 59-137579 |
| Jul. 17, 1984 | [JP] | Japan | 59-149225 |
| Jul. 25, 1984 | [JP] | Japan | 59-155944 |
| Jul. 25, 1984 | [JP] | Japan | 59-155945 |
| Jul. 27, 1984 | [JP] | Japan | 59-158430 |
| Aug. 7, 1984 | [JP] | Japan | 59-166214 |

[51] Int. Cl.$^4$ .................................................. B60T 8/10
[52] U.S. Cl. ....................................... 303/116; 303/97; 303/119
[58] Field of Search ............... 188/181 A; 303/96, 97, 303/98, 99, 116, 117, 119

[56] References Cited

U.S. PATENT DOCUMENTS

| 4,072,366 | 2/1978 | Kondo | 303/116 |
| 4,395,073 | 7/1983 | Arikawa et al. | 303/116 |

*Primary Examiner*—Duane A. Reger
*Attorney, Agent, or Firm*—Burns, Doane, Swecker and Mathis

[57] ABSTRACT

An antiskid control apparatus for an automobile has a motor controlled by a computer for actuating a pump to produce a working fluid pressure in an antiskid control mode. In the antiskid control mode, fluid actuators coupled between a brake master cylinder and wheel cylinders of automobile wheels are controlled by the working fluid pressure to increase and reduce the fluid pressure applied to the wheel cylinders in a cyclic manner until the wheels are no longer subject to a skid.

6 Claims, 1 Drawing Figure

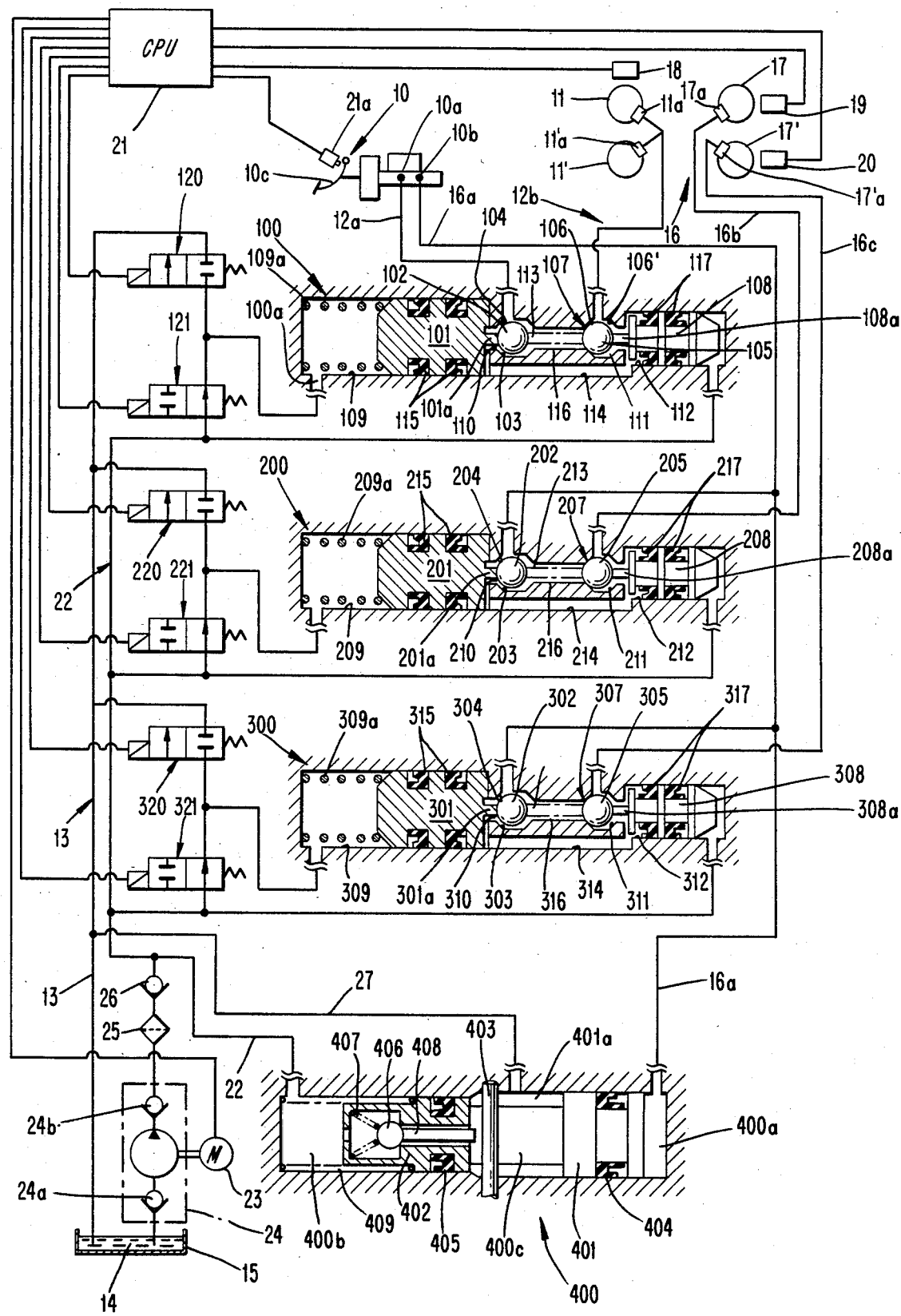

ANTISKID CONTROL APPARATUS FOR AUTOMOBILES

BACKGROUND OF THE INVENTION

The present invention relates to an antiskid control apparatus for use in an automobile, and more particularly to an antiskid control apparatus having a computer-controlled pump which is actuatable in a skid-control mode for producing a working fluid pressure.

One conventional antiskid control apparatus for automobiles is disclosed in British patent application No. 2125149 corresponding to Japanese Laid-Open Patent Publication No. 59-2961.

The disclosed antiskid control apparatus is operated by the hydraulic a power steering system, which is actuated at all times by the engine of the automobile. Therefore, the known antiskid control apparatus cannot be incorporated in automobiles which are not equipped with power steering systems.

If the above antiskid control apparatus were to be installed in an automobile with no power steering system, the antiskid control apparatus would have to be provided with a dedicated hydraulic pump which would be actuated at all times by the automobile engine. However, operating the hydraulic pump at all times would not be preferable because of extra power consumption required. More specifically, the antiskid control apparatus is required to be active only when the automobile is braked. Since the automobile is and remains braked for a time that is much smaller than the total time in which the automobile is in operation, the amount of engine power consumed to operate the hydraulic pump even when the automobile is not braked would be substantial.

SUMMARY OF THE INVENTION

It is an object of the prsent invention to provide an antiskid control apparatus which can be installed in an automobile having no power steering system and consumes much smaller power than would the conventional antiskid control apparatus with its pump actuated by the automobile engine at all times.

According to the present invention, there is provided an antiskid control apparatus for use in an automobile having a brake master cylinder and at least one wheel cylinder, including a fluid pressure circuit for connecting the brake master cylinder and the wheel cylinder, a cutoff valve disposed in the fluid pressure circuit and adapted to be interposed between the brake master cylinder and the wheel cylinder for hydraulically separating the wheel cylinder from the master cylinder, a pump for generating a working fluid pressure, a brake fluid-pressure adjusting piston movable in one direction by a fluid pressure from the wheel cylinder for closing the cutoff valve and for increasing the volume of the fluid pressure circuit between the cutoff valve and the wheel cylinder and also movable in an opposite direction by the working fluid pressure for reducing the volume of the fluid pressure circuit between the cutoff valve to increase the fluid pressure applied to the wheel cylinder and opening the cutoff valve, a pressure regulating valve for regulating the working fluid pressure generated by the pump by applying a resistance responsive to the fluid pressure imposed by the brake master cylinder to a working fluid flowing from a discharge port of the pump to a reservoir, a solenoid-operated valve for supplying and discharging the working fluid pressure to and from the brake fluid-pressure adjusting piston, a wheel speed sensor for detecting the speed of rotation of a wheel associated with the wheel cylinder, an electronic control circuit for detecting whether the wheel is subject to a skid or not based on a signal from the wheel speed sensor, for controlling the solenoid-operated valve to supply the working fluid pressure to the brake fluid-pressure adjusting piston when the wheel is not subject to a skid, and for controlling the solenoid-operated valve to discharge the working fluid pressure from the brake fluid-pressure adjusting piston when the wheel is subject to a skid, a motor for actuating the pump, the motor being controlled by the electronic control circuit for being de-energized at least when the wheel is not braked, and a pressure compensating piston having a pair of pressure bearing areas to which the fluid pressure from the master cylinder and the working fluid pressure are applied, respectively, for generating the working fluid pressure simultaneously with the generation of the fluid pressure from the master cylinder.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWING

The sole FIGURE is a schmatic diagram of an antiskid control apparatus for automobiles according to the present invention.

DESCRIPTION OF THE PREFERRED EMBODIMENT

As shown in the sole FIGURE, a tandem brake master cylinder 10 has a first output port 10a connected through a brake fluid-pressure circuit 12 to the wheel cylinder 11a of an automobile rear wheel 11 and the wheel cylinder 11'a of an automobile rear wheel 11', the brake fluid-pressure circuit 12 including a first actuator 100.

The first actuator 100 includes a brake fluid-pressure regulating piston 101, a cutoff valve 104 composed of a ball 102 and a valve seat 103 positioned on the lefthand side of the ball 102, a bypass valve 107 composed of a ball 105 and a pair of valve seats 106, 106' disposed one on each side of the ball 105, and a bypass piston 108. The piston 101, the cutoff valve 104, the bypass valve 107, and the piston 108 are housed in a first chamber 109, a second chamber 110, a third chamber 111, and a fourth chamber 112, respectively. A passage 113 is defined between the second and third chambers 110, 111. The portion of the first chamber 110 which is on the righthand side of the piston 101 and the portion of the fourth chamber 112 which is on the lefthand side of the piston 108 are held in communication with each other by a passage 114.

A pair of axially spaced cup seals 115 is mounted on the outer circumferential surface of the piston 101 to isolate the chamber portions on the righthand and lefthand sides of the piston 101 from each other in a fluid-tight manner. A projection 101a projecting axially from the righthand end of the piston 101 is held against the ball 102. A spring 116 is disposed between the balls 102, 105 for normally urging them apart from each other. A pair of axially spaced cup seals 117 is mounted on the outer circumferential surface of the piston 108 to isolate the chamber portions on the righthand and lefthand sides of the piston 108 from each other in a fluidtight manner. A projection 108a projecting axially from the lefthand end of the piston 108 is held against the ball 105. A port 100a opening into the first chamber 109 on the lefthand side of the piston 101 is coupled through a first normally closed solenoid-operated valve 120 and a drain circuit 13 to a reservoir 15 storing a working fluid 14, and is also coupled through a second normally open solenoid-operated valve 121 to a working fluid-pressure supply circuit 22.

The piston 101 is normally urged to move in the rightward direction by a spring 109a disposed in the first chamber 109. The spring force of the spring 109a is selected to unseat the ball 102 from the valve seat 103 against the resilient force of the spring 116. The braking fluid discharged under pressure from the first output port 10a of the master cylinder 10 is fed through a pipe 12a into the second chamber 110 in the first actuator 100. The fluid under pressure is then supplied through the passage 113 or the passage 114 and the fourth chamber 112 to the third chamber 111, from which the fluid is fed through a pipe 12b to the wheel cylinders 11a, 11'a of the rear wheel brakes.

Second and third actuators 200, 300 are identical in construction to the first actuator 100. Those parts of the second and third actuators 200, 300 which are identical or correspond to the parts of the first actuator 100 are denoted by the same reference characters as added to 200, 300, respectively.

The brake master cylinder 10 has a second output port 10b coupled through a pipe 16a of a brake fluid-pressure circuit 16 to a second chamber 210 of the second actuator 200 and a second chamber 310 of the third actuator 300. The second actuator 200 has a third chamber 211 coupled through a pipe 16b to a wheel cylinder 17a of a front wheel 17. The third actuator 300 has a third chamber 311 coupled through a pipe 16c to a wheel cylinder 17'a of another front wheel 17'.

Wheel speed sensors 18, 19, 20 are associated with the rear wheel 11, the front wheels 17, 17' and connected to a computer or electronic control circuit 21. The computer 21 and the master cylinder 10 are connected by a switch mechanism 21a. When a brake pedal 10c is depressed, the switch mechanism 21a is actuated to supply the computer 21 with a signal indicating that the master cylinder 10 is operated. When the master cylinder 10 is in operation, the computer 21 compares the wheel rotation speeds as detected by the wheel speed sensors 18, 19, 20 with ideal wheel braking conditions, and determines whether the wheels are skidded.

The computer 21 is also coupled to the first and second solenoid-operated valves 120, 121 for the first actuator 100, first and second solenoid-operated valves 220, 221 for the second actuator 200, first and second solenoid-operated valves 320, 321 for the third actuator 300, and a motor 23. When the computer 21 detects a wheel-skidded state, the computer 21 energizes the motor 23 to actuate a hydraulic pump 24 for supplying a working fluid under pressure through a filter 25 and a check valve 26 to the working fluid-pressure supply circuit 22. The working fluid pressure delivered to the working fluid-pressure supply circuit 22 is very high, and the pump 24 comprises a plunger-type pump equipped with an inlet check valve 24a and an outlet check valve 24b. The check valve 26 provided in addition to the outlet check valve 24b is effective in suppressing pump discharge pressure pulsations transmitted to the working fluid-pressure supply circuit 22. The motor 23 keeps on rotating until the computer 21 detects when no antiskid control is necessary, e.g., when the automobile speed is lowered to the extent where no problem would occur if the wheels were locked. When the computer 21 detects a wheel skid, it opens and closes the first solenoid-operated valve 120 (220, 320) and the second solenoid-operated valve 121 (221, 321), respectively. When the wheel skid is no longer present, the computer 21 restores the solenoid-operated valves to their normal positions.

The fluid pressure in the working fluid-pressure supply circuit 22 during operation of the pump 24 is controlled by a pressure regulating valve 400 having an axially slidable pressure compensating piston assembly composed of a larger-diameter piston 401 and a smaller-diameter piston 402 which are slidably disposed respectively in larger- and smaller-diameter chambers 400a, 400b. The larger-diameter chamber 400a is supplied with the fluid pressure from the master cylinder 10, and the smaller-diameter chamber 400b is supplied with the fluid pressure from the working fluid-pressure supply circuit 22. A fixed pin 403 is loosely fitted in a slot 401a defined in the large-diameter piston 401. The pressure regulating valve 400 has an intermediate chamber 400c communicating with the reservoir 15 through a circuit 27. The chambers 400a, 400b, 400c are defined by larger- and smaller-diameter cup seals 404, 405. A ball valve 406 is supported by a spring 407 in the smaller-diameter piston 402. A rod 408 is disposed in a central axial passage defined in the smaller-diameter piston 402 and is dimensioned so as not to close the central axial passage. When the pistons 401, 402 are slid to the right, the rod 408 is engaged by the pin 403 to displace the ball 406 off the lefthand end of the central axial passage in the piston 402 for bringing the chamber 400b into communication with the chamber 400c through the central axial passage in the piston 402. A spring 409 is disposed in the chamber 400b for normally urging the pistons 401, 402 to move in the rightward direction. When the brake is not applied, the pistons 401, 402 are shifted to the right under the force of the spring 409 to keep the ball 406 unseated off the lefthand end of the central axial passage in the piston 402.

Operation of the antiskid control apparatus will be described. When the brake pedal 10c is depressed to brake the automobile under a certain road condition, the braking fluid under pressure discharged from the first output port 10a of the master cylinder 10 is delivered through the first actuator 100 to the wheel cylinders 11a, 11'a of the rear wheels 11, 11', while the fluid under pressure discharged from the second output port 10b is fed through the second actuator 200 to the wheel cylinder 17a of the front wheel 17 and through the third actuator 300 to the wheel cylinder 17'a of the front wheel 17'. At the same time, the fluid under pressure discharged from the second output port 10b is also supplied through the pipe 16a to the chamber 400a of the pressure regulating valve 400. The pistons 401, 402 are then slid together to the left to cause the ball 406 to contact the lefthand end of the central axial passage in the piston 402 for thereby closing this central axial passage. As the pistons 401, 402 continue to move to the left, the fluid is discharged from the chamber 400b to the working fluid-pressure supply circuit 22 to increase the fluid pressure therein. Since the piston 402 is smaller in diameter than the piston 401, the fluid pressure in the working fluid-pressure supply circuit 22 is higher than the fluid pressure from the master cylinder 10. The pistons 101, 108, 201, 208, 301, 308 in the actuators 100, 200, 300 are kept in the illustrated normal positions in which the balls 102, 202, 302 are unseated from the valve seats 103, 203, 303, respectively, and the balls 105, 205, 305 are unseated from the valve seats 106', 206', 306', respectively, and seated on the valve seats 106, 206, 306, respectively.

As the brake pedal 10c is progressively depressed when the brake starts to be applied, the switch mechanism 21a is actuated and the computer 21 computes actual wheel rotation speeds from the signals fed from the wheel speed sensors 18, 19, 20. The computer 21 also computes ideal braking conditions (specifically, reference wheel speeds reached with wheel decelerations required for slip rates which maximize coefficients n of friction of the wheels with respect to the road), and compares the actual wheel speeds with the reference wheel speeds from time to time.

When the actual rotation speed of the rear wheel 11, for example, becomes lower than its reference wheel speed, i.e., the rear wheel 11 is skidded, the computer 21 generates a signal for energizing the motor 23, a signal for opening the first solenoid-operated valve 120 for the first actuator 100, and a signal for closing the second solenoid-operated valve 121 for the first actuator 100. The pump 24 is actuated by the motor 23 to supply the working fluid pressure through the supply circuit 22 to the chamber portion on the righthand side of the piston 108 to force the piston 108 to the left for thereby keeping the ball 105 held against the valve seat 106. Simultaneously, the fluid pressure is drained from the chamber 109 through the first solenoid-operated valve 120 to the drain circuit 13, the piston 101 is moved to the left and the ball 102 is seated on the valve seat 103, thus closing the cutoff valve 104. As the piston 101 is moved to the left, the volume of the fluid pressure circuit 12 between the cutoff valve 104 and the wheel cylinder 11a (11'a) is increased to reduce the braking fluid pressure applied to brake the rear wheels 11, 11'.

As a result, the wheel rotation speed is restored by the inertia of the automobile and approaches the speed of travel of the automobile. To prevent the slip rate from reaching 0 and the distance over which the automobile is to be braked from being unduly increased, the computer 21 issues a signal for closing the first solenoid-operated valve 120 and opening the second solenoid-operated valve 121. The fluid pressure is then supplied from the working fluid-pressure circuit 22 to the chamber portion on the lefthand side of the piston 101 to move the piston 101 to the right. As the piston 101 is moved to the right, the cutoff valve 104 is opened to increase the braking fluid pressure applied to the wheel cylinders 11a, 11'a.

The above operation is cyclically repeated automatically while the brake pedal 10c is being depressed, to brake the wheels over a minimum distance on the road while preventing the automobile from being subject to a lateral skid which would otherwise be caused by the locking of the wheels. When the antiskid control is over, the computer 21 generates a signal to de-energize the motor 23.

The computer 21 may detect the completion of the antiskid control when the pistons 101, 201, 301 are positioned leftwardly of the illustrated positions. At this time, the ball 406 is unseated from the lefthand end of the central axial passage in the piston 402 under the force of the spring 109 to open the central axial passage so that the fluid from the reservoir 15 can be introduced into the working fluid-pressure supply circuit 22, and the pistons 101, 201, 301 are biased by the springs 109a, 209a, 309a, respectively. Therefore, the pistons 101, 201, 301 can return to the illustrated positions.

The computer 21 may detect a wheel-skidded state in other ways than the illustrated arrangement.

Although a certain preferred embodiment has been shown and described, it should be understood that many changes and modifications may be made therein without departing from the scope of the appended claims.

What is claimed is:

1. An antiskid control apparatus for use in an automobile having a brake master cylinder and at least one wheel cylinder, comprising:
   (a) a fluid pressure circuit for connecting the brake master cylinder and the wheel cylinder;
   (b) a cutoff valve disposed in said fluid pressure circuit and adapted to be interposed between the brake master cylinder and the wheel cylinder for hydraulically separating the wheel cylinder from the master cylinder;
   (c) a pump for generating a working fluid pressure;
   (d) a brake fluid-pressure adjusting piston movable in one direction by a fluid pressure from the wheel cylinder for closing said cutoff valve and for increasing the volume of said fluid pressure circuit between said cutoff valve and said wheel cylinder and also movable in an opposite direction by the working fluid pressure for reducing the volume of said fluid pressure circuit between said cutoff valve to increase the fluid pressure applied to said wheel cylinder and opening said cutoff valve;
   (e) a pressure regulating valve for regulating the working fluid pressure generated by said pump by applying a resistance responsive to the fluid pressure imposed by said brake master cylinder to a working fluid flowing from a discharge port of said pump to a reservoir;
   (f) a solenoid-operated valve for supplying and discharging said working fluid pressure to and from said brake fluid-pressure adjusting piston;
   (g) a wheel speed sensor for detecting the speed of rotation of a wheel associated with said wheel cylinder;
   (h) an electronic control circuit for detecting whether said wheel is subject to a skid or not based on a signal from said wheel speed sensor, for controlling said solenoid-operated valve to supply said working fluid pressure to said brake fluid-pressure adjusting piston when said wheel is not subject to a skid, and for controlling said solenoid-operated valve to discharge said working fluid pressure from said brake fluid-pressure adjusting piston when said wheel is subject to a skid;
   (i) a motor for actuating said pump, said motor being controlled by said electronic control circuit for being de-energized at least when said wheel is not braked; and
   (j) a pressure compensating piston having a pair of pressure bearing areas to which the fluid pressure from said master cylinder and said working fluid pressure are applied, respectively, for generating said working fluid pressure simultaneously with the generation of said fluid pressure from said master cylinder.

2. An antiskid control apparatus according to claim 1, wherein said electronic control circuit includes means for starting to energize said motor when said wheel is subject to a first skid and continuously energizing said motor until the fluid pressure supplied to said wheel cylinder is not required to be controlled.

3. An antiskid control apparatus according to claim 1, wherein the pressure bearing area of said pressure compensating piston to which said fluid pressure from the master cylinder is applied is larger than the pressure bearing area to which said working fluid pressure is applied.

4. An antiskid control apparatus according to claim 1, wherein said pressure regulating valve includes a fluid-pressure-responsive piston responsive to the fluid pressure from said master cylinder, said pressure compensating piston doubling as said fluid-pressure-responsive piston, including a spring for normally urging said pressure compensating piston in a direction to counter the fluid pressure from said master cylinder, said pressure regulating valve being kept open under the bias of said spring when said wheel is not braked.

5. An antiskid control apparatus according to claim 4, including a spring for normally urging said brake fluid-pressure adjusting piston in said opposite direction to position said brake fluid-pressure adjusting piston to open said cutoff valve when said wheel is not braked.

6. An antiskid control apparatus according to claim 1, wherein said pump comprises a plunger-type pump having an outlet circuit composed of two series-connected check valves.

* * * * *